(No Model.)

C. F. HADLEY.
PEDAL FOR VELOCIPEDES.

No. 313,323. Patented Mar. 3, 1885.

WITNESSES:
James B. Clark
Edward B. Ely

INVENTOR
Charles F. Hadley
BY Geo. W. Seymour
ATTORNEY

UNITED STATES PATENT OFFICE.

CHARLES F. HADLEY, OF CHICOPEE, MASSACHUSETTS, ASSIGNOR TO THE OVERMAN WHEEL COMPANY, OF SAME PLACE.

PEDAL FOR VELOCIPEDES.

SPECIFICATION forming part of Letters Patent No. 313,323, dated March 3, 1885.

Application filed August 25, 1884. (No model.)

*To all whom it may concern:*

Be it known that I, CHARLES F. HADLEY, residing at Chicopee, in the county of Hampden and State of Massachusetts have invented certain new and useful Improvements in Pedals for Velocipedes; and I do declare the following to be a full, clear, and exact description of the same, reference being had to the accompanying drawings, which form a part of this specification.

My invention relates to an improvement in pedals for velocipedes, the object being to adapt them to be adjusted for taking up wear upon their ends and end-bearings.

With this end in view my invention consists in a pedal constructed and adapted to be structurally elongated.

My invention further consists in certain details of construction, as will be hereinafter described, and pointed out in the claims.

Figure 1:
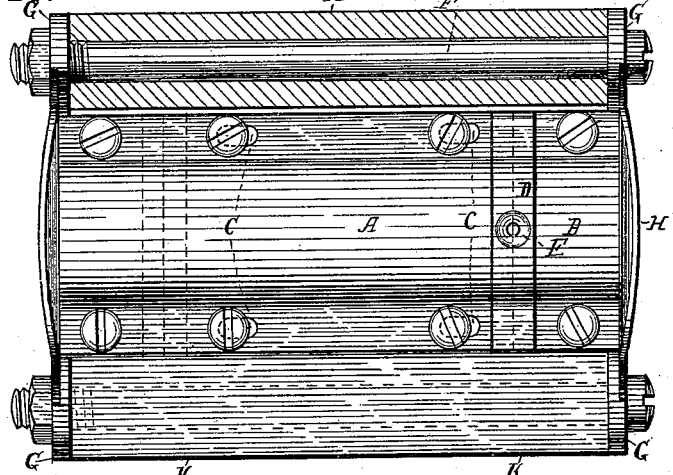
Figure 2:
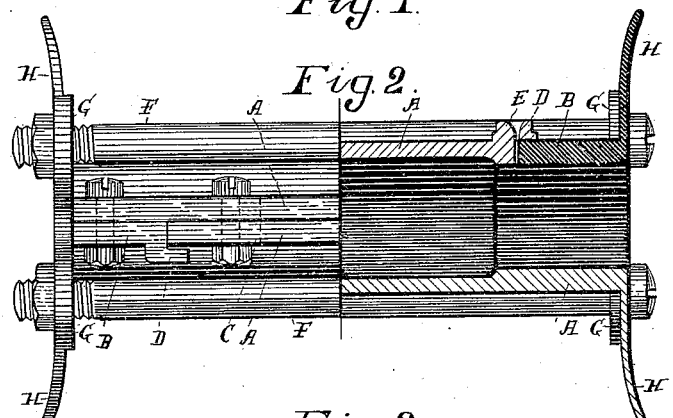
Figure 3:
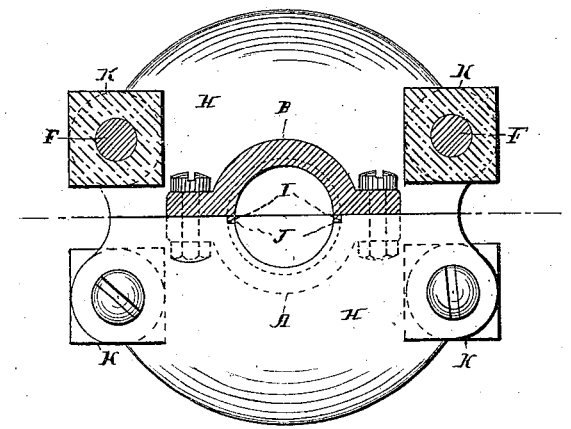

In the accompanying drawings, Figure 1 is a plan view of a pedal embodying my invention. Fig. 2 is a view thereof partly in section and partly in side elevation, and Fig. 3 showing it partly in section and partly in end elevation.

As herein shown, the pedal is composed of two long sections, A, and two short sections, B, of which the opposite long and short sections are firmly bolted together with their outer ends coinciding, while the inner ends of the long sections are adjustably bolted together for enabling the two couples of sections to be drawn apart and thus effect a structural elongation of the pedal. The described adjustment is provided for by an elongation of the bolt-holes C, through which the bolts uniting the said ends of the long sections pass. The narrow spaces opened between the ends of the sections by the elongation of the pedal are covered for excluding foreign matter therefrom by lips D, formed integral with the sections and provided with oiling-apertures, E, as shown. It is evident, however, that independent devices of any suitable construction may be employed in lieu of the lips. In order to accommodate the bearings F to changes in the length of the pedal, they are threaded at one end, and the lugs G of the guards H are tapped and threaded to receive them. The opposite sections are interlocked for preventing them from lateral displacement by means of shoulders I and recesses J, formed at their outer ends.

In virtue of the described construction and arrangement of parts, a perfect compensation for all wear upon the ends of the pedal and its end-bearings may be had by loosening the nuts of the bolts uniting the inner ends of the long sections and those of the bearings and backing the same out of their lugs for a little distance, and then elongating the pedal until all wear has been taken up, after which the nuts of the bolts are tightened and the bearings adjusted to conform to the change in the length of the pedal.

I would have it understood that I do not limit myself to the exact construction and arrangement of parts herein shown and described, but hold myself at liberty to make such changes and alterations as fairly fall within the spirit and scope of my invention.

Having fully described my invention, what I claim as new, and desire to secure by Letters Patent, is—

1. A velocipede-pedal constructed and adapted to be structurally elongated, substantially as set forth.

2. A velocipede-pedal made of sections which are adjustable for elongating it, substantially as set forth.

3. A velocipede-pedal made of two long and two short sections, the opposite long and short sections of which are firmly secured together with their outer ends coinciding, and the inner ends of the long sections being adjustably secured together, substantially as set forth.

4. A velocipede-pedal constructed and adapted to be structurally elongated, and provided with adjustable bearings for its rubbers, substantially as set forth.

5. A velocipede-pedal composed of adjustable sections adapting it to be structurally elongated, the opposite sections being interlocked to prevent lateral displacement, substantially as set forth.

In testimony whereof I have signed this specification in the presence of two subscribing witnesses.

CHARLES F. HADLEY.

Witnesses:
LUTHER WHITE,
ALBERT H. OVERMAN.